(12) United States Patent
Ewing

(10) Patent No.: US 12,531,752 B1
(45) Date of Patent: Jan. 20, 2026

(54) METHOD OF AUTHENTICATING INTEGRATED CIRCUITS USING ELECTRICAL CHARACTERISTICS OF PHYSICALLY UNCLONABLE FUNCTIONS

(71) Applicant: Honeywell Federal Manufacturing & Technologies, LLC, Kansas City, MO (US)

(72) Inventor: Daniel Ewing, Overland Park, KS (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 637 days.

(21) Appl. No.: 17/680,596

(22) Filed: Feb. 25, 2022

(51) Int. Cl.
*H04L 9/32* (2006.01)
*G06F 21/44* (2013.01)
*G06F 21/73* (2013.01)

(52) U.S. Cl.
CPC ............ *H04L 9/3278* (2013.01); *G06F 21/44* (2013.01); *G06F 21/73* (2013.01)

(58) Field of Classification Search
None
See application file for complete search history.

(56) References Cited

U.S. PATENT DOCUMENTS

| | | | |
|---|---|---|---|
| 7,665,049 B2 | 2/2010 | Muranaka | |
| 7,840,803 B2 | 11/2010 | Clarke et al. | |
| 8,659,124 B2 | 2/2014 | Roest et al. | |
| 8,741,713 B2 | 6/2014 | Bruley et al. | |
| 10,019,565 B2 | 7/2018 | Ewing | |
| 2014/0042442 A1* | 2/2014 | Bruley | ............... G06F 21/73 257/E21.531 |
| 2017/0177853 A1* | 6/2017 | Ewing | ............... H01L 23/576 |

FOREIGN PATENT DOCUMENTS

| | | |
|---|---|---|
| CA | 2362962 | 5/2008 |
| WO | 2009/079050 | 6/2009 |

* cited by examiner

*Primary Examiner* — Jany Richardson
(74) *Attorney, Agent, or Firm* — Hovey Williams LLP

(57) ABSTRACT

A method and apparatus for reading unique identifiers of an integrated circuit. The unique identifiers may be physically unclonable functions (PUFs), formed by high energy ions implanted into semiconductor material of the integrated circuit. The method may include electrically stimulating each of the PUFs and sensing measurable electrical characteristics of the PUFs. Furthermore, the method may include comparing values associated with the measurable electrical properties of the PUFs with groups of stored values in a circuit database. Each of the groups of stored values may be associated with measurable electrical properties of PUFs of a known authentic circuit. The method may also include the controller providing verification of authenticity of the integrated circuit when each of the values associated with the measurable electrical properties of the PUFs match the stored values of at least one of the groups in the circuit database.

19 Claims, 4 Drawing Sheets

METHOD OF AUTHENTICATING INTEGRATED CIRCUITS USING ELECTRICAL CHARACTERISTICS OF PHYSICALLY UNCLONABLE FUNCTIONS

STATEMENT REGARDING FEDERALLY-SPONSORED RESEARCH OR DEVELOPMENT

This invention was made with Government support under Contract No.: DE-NA-0002839 awarded by the United States Department of Energy/National Nuclear Security Administration. The Government has certain rights in the invention.

BACKGROUND

Detecting counterfeit electronics, such as integrated circuits, is an important challenge facing many companies, because such counterfeiting can cause significant economic losses. Unfortunately, detecting counterfeit integrated circuits is difficult because such circuits are mounted inside electronic devices.

One anti-counterfeit method uses an electrical process in which variations in fabrication of the circuit lead to variations in electrical properties. These variations, often referred to as physically unclonable functions (PUFs), are then used as identifiers. Current methods to create PUFs for integrated circuits (ICs) utilize variations in the fabricated structures. For example, small changes in the thickness or width of a metal line will change the overall resistance of the metal line. Similarly, changes in thickness in the insulating material change the capacitance of a metal-insulator-metal capacitor. When part of a larger integrated circuit, the changes in electrical properties of the individual elements can undesirably change properties of the integrated circuit, such as the RC time constant, for example. Furthermore, standard PUFs tend to fail at temperatures above 125 degrees C., which is well below the operating threshold for common electronics.

Thus, there is a need for a simplified and more durable method of verifying the authenticity of integrated circuits.

SUMMARY OF THE INVENTION

Embodiments of the present invention solve the above-mentioned problems and provide a distinct advance in the art of verifying the authenticity of integrated circuits. In accordance with some embodiments, a method for reading physically unclonable functions (PUFs) on an integrated circuit may include electrically stimulating one or more of the PUFs. The PUFs may be formed by high energy ions implanted into semi-conductor material of the integrated circuit. The method may also include sensing measurable electrical characteristics of the PUFs based on the electrical simulation thereof. Furthermore, the method may include comparing values associated with the measurable electrical properties of the PUFs with groups of stored values in a circuit database. Each of the groups of stored values may be associated with measurable electrical properties of PUFs of a known authentic circuit. The method may also include the controller providing verification of authenticity of the integrated circuit when each of the values associated with the measurable electrical properties of the PUFs match the stored values of at least one of the groups in the circuit database.

In accordance with other embodiments, a method of reading PUFs on an integrated circuit may include electrically stimulating each of the PUFs, and the PUFs may include high energy ions implanted into crystal lattices of semiconductor material of the integrated circuit at a plurality of locations by ion implanters and/or focused ion beam tools, each location forming one of the PUFs having unique associated damage. Furthermore, the method may include sensing, with an electrical sensor, measurable electrical properties of the PUFs when electrically stimulated. For example, the measurable electrical properties of the PUFs may include ideality factor, Schottky barrier height, resistivity, reverse leakage current, carrier mobility, sheet resistance, and/or doping concentration. Additionally, the method may include comparing, via a controller, values associated with the measurable electrical properties of the PUFs with one or more groups of stored values in a circuit database. Each of the groups of stored values may be associated with previously-logged measurable electrical properties of PUFs of at least one known authentic circuit. The method may also include a step of providing, via the controller, audible or visual indication of authenticity of the integrated circuit when each of the values associated with the measurable electrical properties of the PUFs match the stored values of at least one of the groups in the circuit database.

In accordance with yet another embodiment, an authentication is disclosed as having a notification device including a user interface, a visual display device, and/or a speaker, as well as a controller. The controller may include a processor and memory. The memory may be a non-transitory computer-readable medium with a computer program stored thereon. The computer program may comprise code segments for performing various method steps. For example, the computer program may comprise a code segment for instructing an energy source to electrically stimulate one or more PUFs by passing an electric current or strong electric field through each of the PUFs. As with other embodiments, the PUFs may include high energy ions implanted into crystal lattices of semiconductor material of the integrated circuit at a plurality of locations by ion implanters and/or focused ion beam tools, each location forming one of the PUFs having unique associated damage. The computer program may also comprise a code segment for receiving, from an electrical sensor, measurable electrical properties sensed from the PUFs when electrically stimulated. The measurable electrical properties of the PUFs of the integrated circuit include ideality factor, Schottky barrier height, resistivity, reverse leakage current, carrier mobility, sheet resistance, and/or doping concentration. The computer program can further include a code segment for comparing values associated with the measurable electrical properties of the PUFs with one or more groups of stored values in a circuit database. Eac of the groups of stored values may be associated with previously-logged measurable electrical properties of PUFs of at least one known authentic circuit. Additionally, the computer program can include a code segment for commanding the notification device to output an audible or visual indication of authenticity of the integrated circuit when each of the values associated with the measurable electrical properties of the PUFs match the stored values of at least one of the groups of stored values in the circuit database. Likewise, the computer program can include a code segment for commanding the notification device to output an audible or visual indication that the integrated circuit is a counterfeit circuit when each of the values associated with the measurable electrical properties of the PUFs do not match the stored values of at least one of the groups of stored values in the circuit database.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
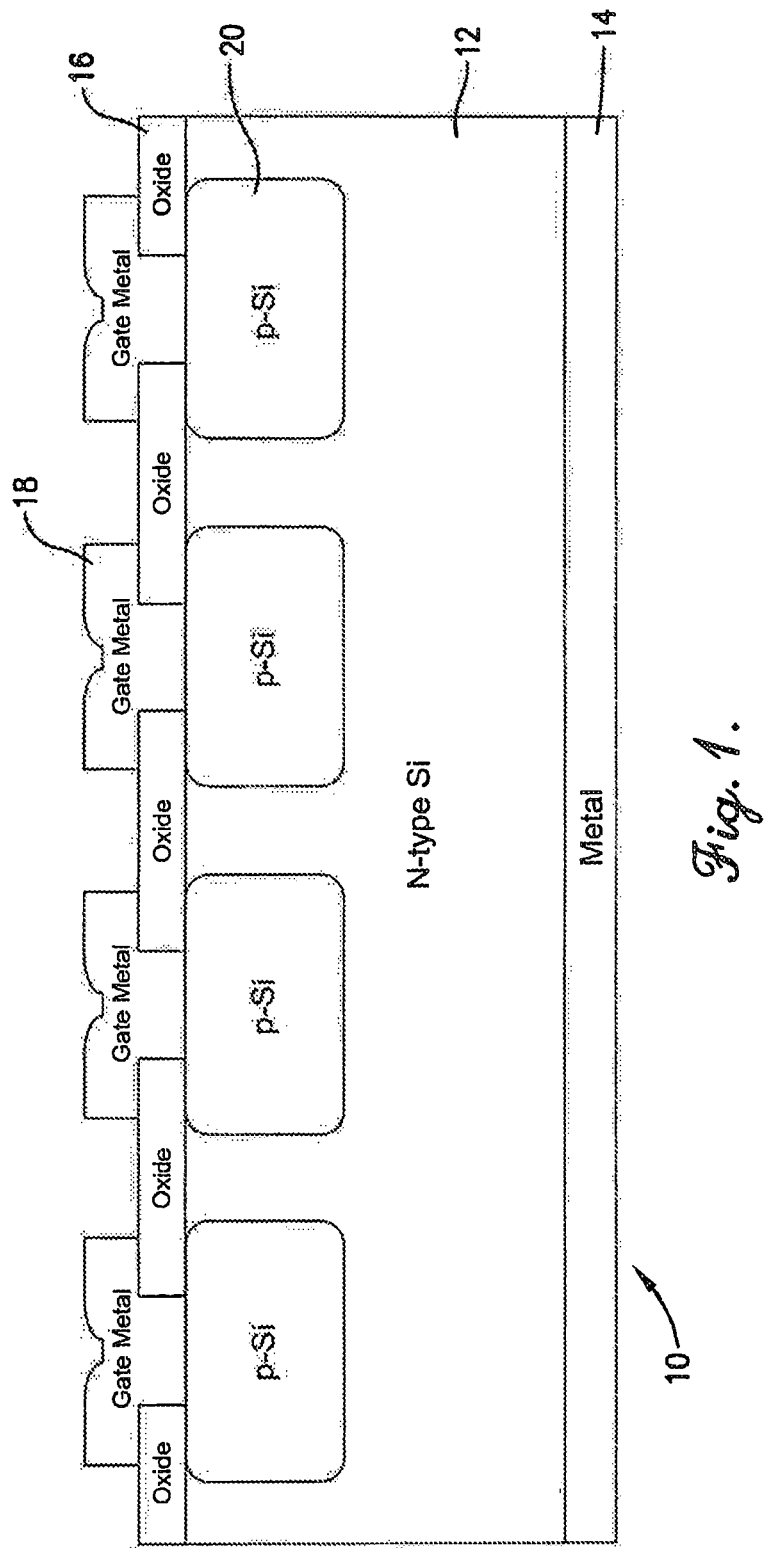
FIG. 1 is a schematic cross-sectional view of an integrated circuit constructed according to embodiments of the present invention, illustrating physically unclonable functions (PUFs) having varying material and electrical properties

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

To overcome the disadvantages of the prior art, as described above, embodiments described herein utilize inherent variations in a semiconductor that effect measurable properties, such as conductivity or resistance. Specifically, the systems and methods described herein create a unique identifier for integrated circuits by using the material properties of the underlying semiconductor substrate as the source of entropy for identification/authentication purposes. Defects in the semiconductor that result from the wafer fabrication process cause slight variations in electrical properties of the semiconductor such as carrier mobility, sheet resistance, and doping concentration. These material properties can influence the electrical properties of devices such as diodes and transistors. By utilizing the random variations in the material properties, physically unclonable functions (PUFs) can be created using simple devices such as metal-semiconductor diodes, p-n diodes, and transistors.

There are several advantages gained by utilizing the semiconductor as a source of entropy. The defects in the semiconductor are much more tolerant to harsh environments, such as high temperature. As noted above, standard PUFs tend to fail at temperatures above 125 degrees C., which is well below the operating threshold for common electronics. Furthermore, every semiconductor material system generally has material defects, such as point defects and dislocations. Thus, the methods described herein can be implemented in both silicon integrated circuits as well as other material systems, such as gallium arsenide (GaAs) and gallium nitride (GaN).

Crystal lattices of semiconductors may be implanted with high energy ions during integrated circuit fabrication, creating areas with a random distribution of point and line defects. Further high temperature device processing may introduce more entropy, as each implanted area recrystallizes differently, dependent on the initial distribution of defects. As a result, each implanted area of the semiconductor will have slightly different, and unique, electrical properties, such as carrier mobility, sheet resistance, and doping concentration. Simple electronic devices, such as diodes (e.g., metal-semi-conductor diodes or p-n junctions), fabricated on the implanted areas will have unique electrical properties that depend on the underlying material properties (e.g., the uniformity of the underlying semiconductor) and can be easily made as part of the integrated circuit fabrication cycle. For example, two diodes with a different number of dislocations or point defects in the underlying semiconductor will have different measurable electrical properties, such as ideality factor or Schottky barrier height. When multiple such devices and/or PUFs are grouped together, each with its own unique characteristics/electrical properties, a unique identifier (similar to a bar code) or PUF is created.

Conversely, for traditional PUFs in integrated circuits, the variation comes from the fabricated levels. The small variations in electrical properties, like resistance and capacitance, are quantified in the integrated circuit's performance. The systems and methods herein instead use variation in the underlying silicon substrate as the source of variation. Specifically, the technology described herein differs from other PUFs in that the material properties are the source of the entropy and randomness, rather than small variations in the active layers of the device. Utilizing material properties of the semiconductor as an entropy source, rather than electrical properties of a transistor has a number of advantages. The material properties are much more stable with temperature. These PUFs are also not easily replicated, such as a key stored in memory.

Embodiments of the invention, illustrated in FIGS. 1-6, may include an authentication apparatus 28 and methods for detecting and deciphering unique identifiers on an integrated circuit 10. Using silicon as an example, a schematic diagram of the integrated circuit 10 comprising silicon Schottky diodes and a unique ID. (e.g., the PUFs described above) formed therein is shown in FIG. 1. The integrated circuit 10 can include a substrate 12, a backside 14, a dielectric material 16, gates 18, and ion implants 20 used to form the PUFs. In this exemplary embodiment, the substrate 12 may be n-type silicon, with the ion implants 20 being p-type (boron) implants. However, other substrates and ion implantation described herein can be used without departing from the scope of this technology. For example, the substrate 12 may comprise one or more semi-conductor materials such as any combination of Si, SiGe, GaAs, and/or GaN.

In some embodiments, the substrate 12 may have a conductive metal or backside 14 such as aluminum or other conductive materials known in the art applied to the bottom of the substrate 12 and may have one or more layers of a dielectric material 16, such as a silicon dioxide ($SiO_2$) applied over the substrate 12 or semi-conductor materials, as illustrated in FIG. 1. Note that aluminum and other conductive metals may also be used at other locations on the integrated circuit 10, forming various electrical devices such as the gates 18, components, and connections thereon. For example, electrical contact may be made by using standard gate metal for the gates 18, completed with the backside 14 made of some metal and used as an electrical contact at the end of an integrated circuit wafer processing. The layout of the circuit 10 may be modified to create openings in the dielectric material 16 for the ion implants 20. Various processing, such as high temperature diffusion, may follow the ion implants 20.

The substrate 12 may include crystal lattices into which high energy ions may be implanted during integrated circuit fabrication, thereby creating the ion implants 20. The ions implants 20 implanted into the crystal lattices may include, for example, boron and/or phosphorus, as illustrated in FIG. 1. However, in some embodiments, silicon, boron, phosphorus, and/or arsenic may be used as implant materials to modulate the electrical properties of the PUFs. Defect areas created by this ion implantation may include amorphous regions. After annealing, the amorphous regions may recrystallize, with a large number of line defects or dislocation loops. The ion implantation may also create unique measurable electrical properties, as described herein.

Figure 2:
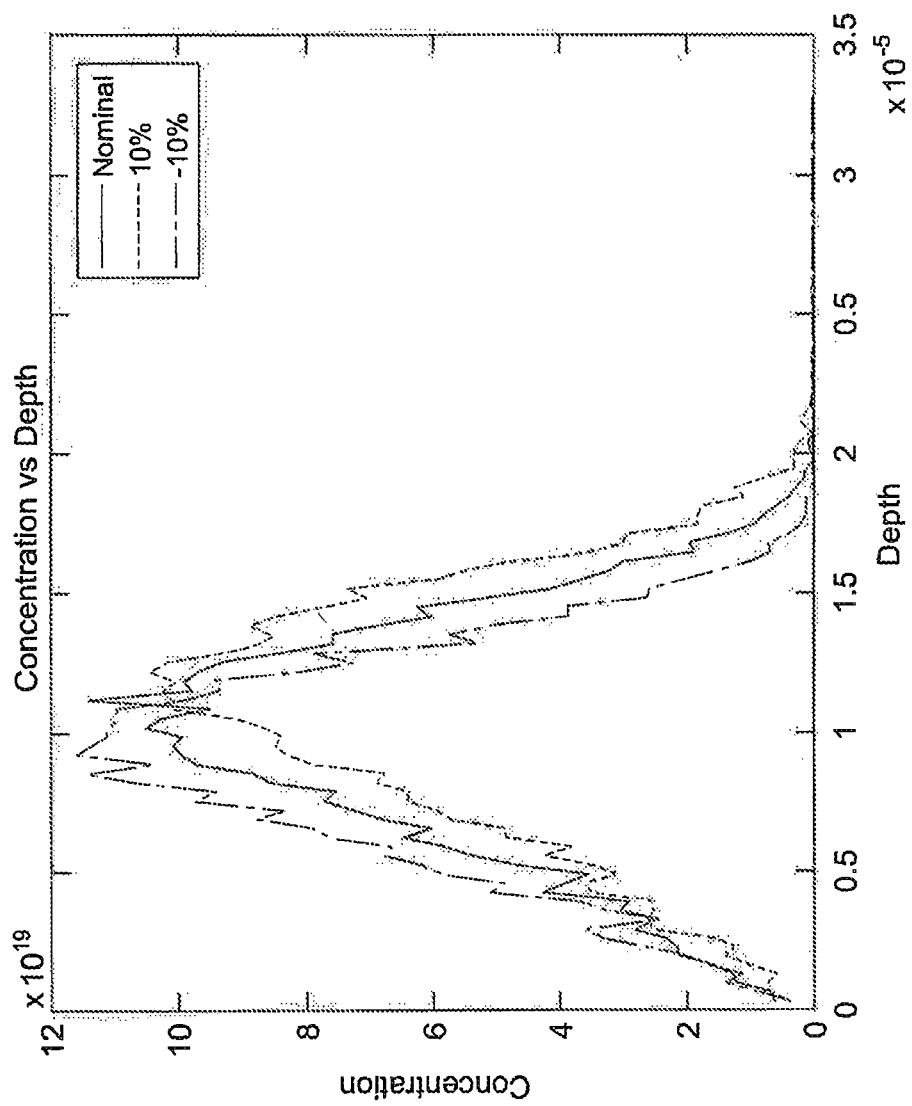
FIG. 2 is a chart comparing dopant depth versus concentration of implanted PUFs described in various embodiments herein.

The measurable electrical properties described herein may be directly related to the defect density and types of defects in the semiconductor material or substrate 12. These may include ideality factor, Schottky barrier height, resistivity, and reverse leakage current, for example. However, other measurable electrical properties can be sensed, detected, or analyzed without departing from the scope of the technology described herein, such as carrier mobility, sheet resistance, and doping concentration. The PUFs described herein can be seamlessly inserted during an integrated circuit/wafer fabrication process with only simple design changes to a circuit's layout and very little to no design changes to any active devices of the circuit. The primary source of introduced entropy may come from the ion implantation step, as later described herein. In this step, the substrate 12 may be implanted with ion implants 20 to generate a change in conductivity. The implant process also results in significant changes in the crystallinity of the semiconductor and also its optical properties. While the ion implant process is highly controlled, there are still process variations in terms of dose, energy, and accelerating voltage which can lead to changes in the total number of defects and the amount of dopants, in turn effecting the electrical properties. For example, FIG. 2 shows a simple simulation of dopant concentration as a function of depth. When the dopant concentration changes by 10%, the depth of the concentration peak correspondingly changes. For GaAs and GaN, argon may be used as a neutral atom to create a high resistivity amorphous region that isolates the active region.

In some alternative embodiments, other silicon diode types may use p+ and n-implants to create a lateral diode device in accordance with some of the methods described herein. In addition, these methods described herein may also be used for transistors, where an implanted region acting as a channel can have small variations in conductivity due to defects in the semiconductor. This change in conductivity can be observed in metrics such as threshold voltage or conductance. Similarly, the diode model described herein may be used for other semiconductors, such as GaAs and GaN. Diodes fabricated on top of argon-implanted regions can have different properties depending on an amount of lattice damage and ion concentration.

Figure 3:
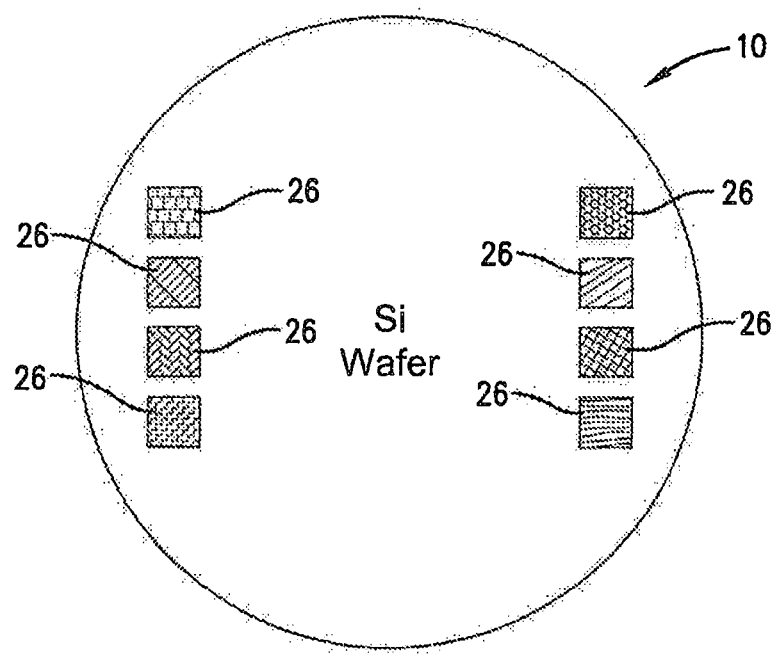
FIG. 3 is a top view of the integrated circuit of FIG. 1, illustrating ion implant regions or PUFs with varying material and electrical properties.

As illustrated in FIG. 3, the integrated circuit 10 may include a plurality of locations at which the high energy ions implants 20 are implanted. At each of these locations, the ion implants 20 may form areas of defect which can respond in a unique and measurable manner when electrically stimulated. Specifically, the resulting damage at each of these locations may be referred to herein as unique identifiers or PUFs 26. The PUFs 26 are represented in FIG. 3 with different patterns representing small random changes in material properties due to varying acceleration energy, ion dose, and/or beam size used in the creation of the PUFs 26. The resulting material variations for each of the PUFs 26 can include ion implant concentration, how many atoms are implanted, ion implant depth, number of dislocation loops, and/or a size of an area that is implanted for each of the PUFs 26. Dislocation loops may be defined herein as line defects in the semiconductor material or substrate 12, or an extra line of atoms inserted between two other lines of atoms and completely contained in the crystal lattice. The higher the dose or the higher the acceleration energy used during ion implantation, the more dislocation loops created. Furthermore, the measurable electrical properties of the PUFs 26 may also be dependent upon at least one of implantation depth of the high energy ions, implantation concentration of the high energy ions, defect density in the semi-conductor material, and types of defects in the semiconductor material.

At least some of the PUFs 26 on the integrated circuit 10 may have differing measurable electrical properties than others when electrically stimulated, resulting in differing ideality factors, Schottky barrier heights, resistivities, and/or reverse leakage currents, for example, based on their differing material properties described above. Additionally or alternatively, when electrically stimulated, measuring the PUFs 26 can allow detection of differing carrier mobility, sheet resistance, and doping concentration, for example. The resulting measurable electrical properties of each of the PUFs 26 may be sensed and then logged or recorded in a database for later verification of the authenticity of the integrated circuit 10. For example, the plurality of locations implanted with PUFs 26 may include sixty-four discrete areas, cooperatively providing a sixty-four digit key serving as a circuit authentication identifier for the circuit 10. In FIG. 3, eight PUFs 26 are illustrated, each of which may represent specific values and/or specific measurable electrical properties measured and stored in a database for a particular manufacturer or authentication agency.

In some embodiments of the invention, the ion implants 20 implanted to form the PUFs 26 may be performed by an ion implantation device (not shown). The ion implantation device may include standard semiconductor fabrication tools known in the art, such as an ion implanter, focused ion beam tools, or any other device(s) known in the art for creating small random changes in material properties of the circuit's crystal lattice. Furthermore, the ion implantation device may be configured to manually of automatically vary acceleration energy, ion dose, and/or beam size in order to vary the resulting material properties of the PUFs 26 to be measured and identified, as later described herein.

Figure 4:
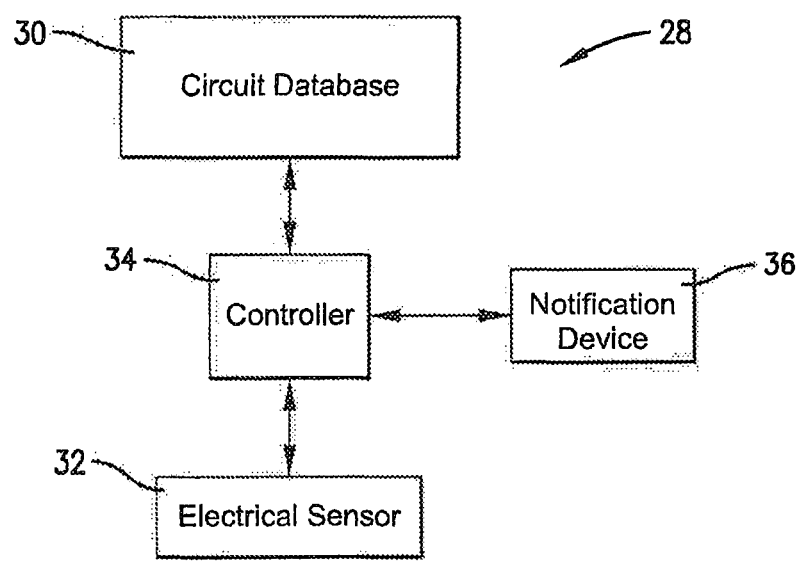
FIG. 4 is a block diagram of an authentication apparatus for analyzing measurable electrical properties sensed from the PUFs when electrically stimulated.

Some embodiments of the invention, as illustrated in FIG. 4, may include an authentication apparatus 28 configured to document the PUFs 26 and/or authenticate the integrated circuit 10 using PUF data stored in a circuit database 30. The authentication apparatus 28 may include an electrical sensor 32, the circuit database 30, and/or a controller 34 configured to receive electrical measurements from the electrical sensor 32 and to compare those measurements with circuit authentication information stored in the circuit database 30.

The electrical sensor 32 may be any one or more sensors configured to measure or otherwise detect the various measurable electrical properties of the PUFs 26 when electrically activated. For example, the electrical sensor 32 can be an electrical wire or probe electrically coupling the integrated circuit 10 with the controller 34. One or more energy sources (not shown) configured for electrically stimulating the PUFs 26 as described above may be used in conjunction with the electrical sensor 32 and/or may be integrated with the electrical sensor 32. The electrical sensor 32 may be communicatively coupled with the controller 34, to send information related to the measurable electrical properties of the PUFs 26 back to the controller 34 to be analyzed.

The circuit database 30, as illustrated in FIG. 4, may comprise residential or external memory that may be integral with the controller 34, stand-alone memory, or a combination of both. The memory may include, for example, removable and non-removable memory elements such as RAM, ROM, flash, magnetic, optical, USB memory devices, MMC cards, RS MMC cards, SD cards such as microSD or miniSD, SIM cards, and/or other memory elements. The circuit database 30 may store, for example, keys, codes, variables, or other values corresponding to measurable electrical properties and/or material properties of the PUFs 26 of one or more circuits. These stored values may include values associated with differing ideality factors, Schottky barrier heights, resistivities, reverse leakage currents, carrier mobility, sheet resistance, and/or doping concentration, for example.

The controller 34 may comprise any number of combination of processors, circuits, integrated circuits, programmable logic devices such as programmable logic controllers (PLC) or motion programmable logic controllers (MPLC), computers, processors, microcontrollers, transmitters, receivers, other electrical and computing devices, and/or residential or external memory for storing data and other information about the electrical sensor 32 and/or the PUFs 26. The controller 34 may control operation of the electrical sensor 32 and/or receive signals corresponding to measurable electrical properties or signals sensed thereby to be stored in the circuit database 30 during the manufacturing stage and then later compared to values stored in the circuit database 30 to determine authenticity of the circuit 10.

The controller 34 may be configured to implement any combination of algorithms, subroutines, computer programs, or code corresponding to method steps and functions described herein. The controller 34 and computer programs described herein are merely examples of computer equipment and programs that may be used to implement the present invention and may be replaced with or supplemented with other controllers and computer programs without departing from the scope of the present invention. While certain features are described as residing in the controller 34, the invention is not so limited, and those features may be implemented elsewhere. For example, one or more of the circuit databases 30 may be remotely accessed by the controller 34 for retrieving PUF-related measurements without departing from the scope of the invention.

The controller 34 may implement the computer programs and/or code segments to perform various method steps described herein. The computer programs may comprise an ordered listing of executable instructions for implementing logical functions in the controller. The computer programs can be embodied in any computer-readable medium for use by or in connection with an instruction execution system, apparatus, or device, and execute the instructions. In the context of this application, a "computer-readable medium" can be any physical medium that can contain, store, communicate, propagate, or transport the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), a portable compact disk read-only memory (CDROM), an optical fiber, multi-media card (MMC), reduced-size multi-media card (RS MMC), secure digital (SD) cards such as microSD or miniSD, and a subscriber identity module (SIM) card.

In some embodiments of the invention, the authentication apparatus 28 may further comprise and/or be communicably coupled with a notification device 36, such as a user interface, visual display device, and/or speaker, any of which may communicate to a user, visually or audibly. For example, the visual display device may be a computer screen or may simply be one or more LEDs configured to visually indicate if the integrated circuit 10 is determined by the controller 34 to be authentic or counterfeit. Additionally or alternatively, the speaker may be configured to output an audible indication to the user regarding the authenticity of the integrated circuit 10. In some embodiments of the invention, the notification device 36 may further include a wireless transmitter configured to transmit information from the controller 34 to a remote notification device, such as another computer, tablet, smart phone, or the like.

In use, the integrated circuit 10 may be tagged and identified at the wafer scale during fabrication. For example, the authentication apparatus 28 may measure and record measurable electrical properties of the PUFs 26 of the circuit 10 in the circuit database 30. Then, to later verify the authenticity of the circuit 10, the authentication apparatus 28 may again measure the measurable electrical properties of the circuit 10 and compare those measurable electrical properties to those earlier recorded and stored in the circuit database 30. The authentication apparatus 28 may then communicate to a user whether or not the circuit 10 is authentic or is a counterfeit circuit. That is, if the measurable electrical properties from the PUFs being measured do not correspond with any of the measurements recorded or otherwise stored in the circuit database 30, the authentication apparatus 28 may identify the circuit 10 as a counterfeit.

Figure 5:
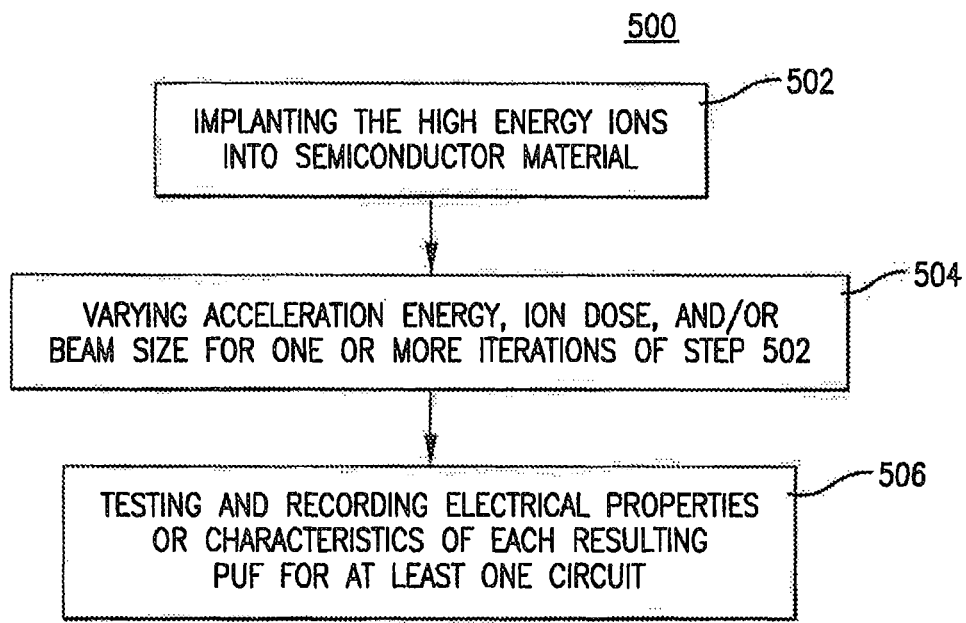
FIG. 5 is a flow chart illustrating a method of marking an integrated circuit with PUFs in accordance with embodiments of the present invention.
Figure 6:
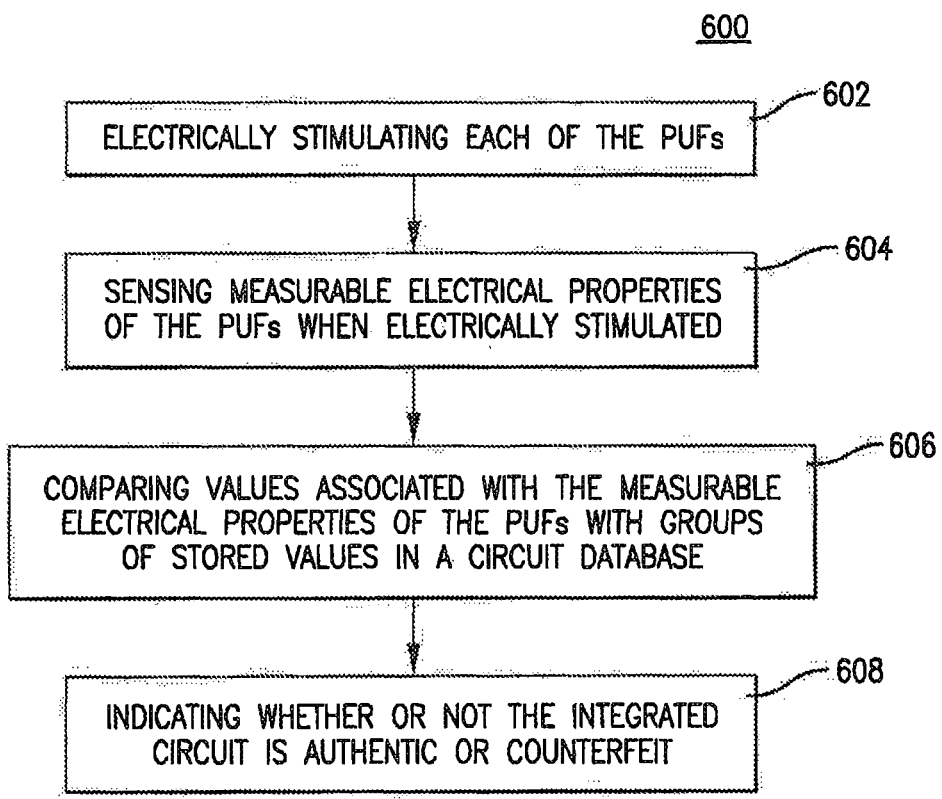
FIG. 6 is a flow chart illustrating a method of detecting and deciphering PUFs on the integrated circuit in accordance with embodiments of the present invention.

Method steps for marking and/or identifying unique identifiers or PUFs 26 on the integrated circuits 10 will now be described in more detail, in accordance with various embodiments of the present invention. The steps of the methods 500 and 600 may be performed in the order as shown in FIGS. 5 and 6, or they may be performed in a different order. Furthermore, some steps may be performed concurrently as opposed to sequentially. In addition, some steps may not be performed.

As illustrated in FIG. 5, the method 500 of marking circuits, such as the integrated circuit 10, with unique identifiers or PUFs may include a step of implanting the high energy ions (e.g., ion implants 20) into crystal lattices of the semiconductor material/substrate 12 of the circuit 10 at a plurality of locations using ion implanters and/or focused ion beam tools, as depicted in block 502. This may be done to improve conductivity of certain regions, to isolate devices of the circuit 10 from each other, and/or to intentionally create the PUFs 26 described herein. Because of slight variations in the fabrication process, each resulting defect center or PUF 26 is unique, which causes unique electrical properties and characteristics. Thus, at least some of the PUFs 26 may have differing electrical properties or characteristics than others of the PUFs 26 when electrically stimulated. In the integrated circuit 10 depicted in FIG. 3, eight discrete areas of damage may be associated with an eight-digit key serving as a circuit authentication identifier. However, in another embodiment of the invention, the plurality of locations implanted with PUFs 26 may include sixty-four discrete areas, cooperatively providing a sixty-four digit key serving as the circuit authentication identifier for that circuit. Any number of PUFs 26 may be formed on the integrated circuit 10 without departing from the scope of the technology herein.

In some embodiments, the method 500 may also include a step of varying acceleration energy, ion dose, and/or beam size used for creation of the PUFs 26, as depicted in block 504, thereby affecting how deep the ions/implants 20 are implanted, how many atoms are implanted, and/or a size of an area that is implanted for each of the PUFs 26. These characteristics of the PUFs 26 may in turn affect electrical properties measured by these PUFs 26 when electrically stimulated. Furthermore, the method 500 may include a step of testing and documenting electrical properties or characteristics of the PUFs 26 for each circuit, as depicted in block 506. For example, for each known authentic circuit, a group of values associated with electrical characteristics of PUFs of that known authentic circuit may be stored in the circuit database 30. Additionally or alternatively, measurable electrical properties for each of the PUFs 26 may be determined and stored in the circuit database 30 for a particular company, industry, or agency, to be looked up for later authentication.

As illustrated in FIG. 6, the method 600 of detecting and deciphering the unique identifiers or PUFs 26 on the circuits, such as the integrated circuit 10, may include the steps of electrically stimulating each of the PUFs 26, as depicted in block 602, and sensing with the electrical sensor 32 measurable electrical properties of the PUFs 26 when electrically stimulated, as depicted in block 604. This may be done automatically via commands from the controller 34 or may be accomplished manually by a user electrically stimulating a desired location where the PUFs 26 are located and/or placing the electrical sensor 32 at a desired location relative to the circuit 10 to detect the PUFs 26. Note that some manufacturers may chose a specific region on the circuits in which to locate the ions/implants 20 forming these PUFs 26. Thus, authorizing personnel and/or the authentication apparatus 28 may be provided information regarding where the electrical stimulation and/or the electrical sensor 32 must be placed in relation to these PUFs 26 in order to properly measure their electrical properties. For example, the gates 18 may be labeled on the circuit 10 such that it is clear to authorizing personnel where the PUFs 26 to be measured are located and electrical stimulation and/or measurement may occur across one or more of the gates 18 and/or the conductive metal backside 14.

Next, the method 500 may include a step of comparing values associated with the measurable electrical properties of the PUFs 26 with one or more groups of stored values in the circuit database 30, as depicted on block 606. For example, the comparing step 606 may include obtaining ideality factors, Schottky barrier heights, resistivities, reverse leakage currents, carrier mobility, sheet resistance, and/or doping concentration from each of the PUFs 26 and/or a plurality of the PUFs 26, and then assigning a value to each of the PUFs 26 based on those or other measurable electrical characteristics. This value may be assigned based on an algorithm solved using one or more of those measurable electrical properties or based on a look-up table using one or more of those measurable electrical properties. In one example embodiment of the invention, if one of the measurable electrical properties of a given PUF 26 is above a predetermined threshold value; that PUF 26 may be assigned the numeral 1, but if that measurable electrical property is below the predetermined threshold value, that PUF 26 may be assigned to the numeral 0. The resulting string of 1's and 0's thus associated with each of the PUFs 26 of the circuit 10 may then be compared to a plurality of strings of 1's and 0's stored in the circuit database 30 to determine the authenticity of that circuit 10.

In some embodiments of the invention, the comparing step may further include determining, using the measurable electrical properties of each of the PUFs 26, at least one of implantation depth of the high energy ions, implantation concentration of the high energy ions, defect density in the semiconductor material, and types of defects in the semiconductor material. Additionally or alternatively, the comparing step can further include determining, using the measurable electrical properties, a quantity of dislocation loops, how many atoms are implanted, or a size of area of each of the PUFs 26. In embodiments where these characteristics are determined, the resulting information may then be used in the assigning of the values for each of the PUFs 26. The values assigned to each of the PUFs 26 may cooperatively form a circuit identifier. Thus, the comparing step 606 may include determining if the circuit identifier matches at least one of the groups of values stored in the circuit database 30. As noted above, each of the groups of stored values in the circuit database 30 may be associated with measurable electrical properties of PUFs of a known authentic circuit.

Finally, the method 600 may include a step of providing an indication of whether or not the integrated circuit 10 is authentic or counterfeit, as depicted in block 608. When each of the values associated with the sensed or measured electrical properties of the PUFs 26 (i.e., the circuit identifier) match the stored values of at least one of the groups in the circuit database 30, then the controller 34 may audibly or visually indicate that the circuit 10 is authentic. Conversely, when each of the values associated with the sensed/measured electrical properties of the PUFs 26 (i.e., the circuit identifier) do not match the stored values of at least one of the groups in the circuit database 30, then the controller 34 may audibly or visually indicate that the circuit 10 is a counterfeit. For example, the controller 30 may output authentication information on the visual display device and/or speaker described above to notify the user that the circuit 10 is either authentic or was determined by the controller 30 to be a counterfeit circuit. Alternatively, the controller 34 may only provide audible or visual feedback to the user if the circuit 10 is determined to be authentic or conversely if the circuit 10 is determined to be counterfeit.

Embodiments of the invention described above may be used commercially to prevent counterfeiting of common electronics. It could also be used in defense applications to provide a simple test-and-detect method to ensure a trusted supply chain for critical microelectronic devices. When applied to different semiconductors, such as Si, SiGe, GaAs, and GaN, the implanting of ions could be tailored to that particular material to provide optimum measurable output/electrical properties when electrically stimulated.

Advantageously, because ion implants are a typical and often trivial part of the semiconductor manufacturing process and are buried beneath a surface layer of the integrated circuit 10, it is nearly impossible for competitors or counterfeiters to detect the material PUFs 26 of the present invention. Likewise, small differences in ion implant density are also nearly impossible to detect and even harder to replicate. Conversely, prior art PUFs could only be used in Si CMOS circuitry and required fabrication of complex integrated circuitry, making it obvious that the device had been identified as important enough to protect. The prior art PUFs also suffer from reliability issues when heated above 200 degrees Celsius. Advantageously, the material PUFs 26 of the present invention may be reliable up to 500 degrees Celsius, as the recovery process for defects has a very high activation temperature.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A method of reading physically unclonable functions (PUFs) on an integrated circuit, the method comprising:
  electrically stimulating each of the PUFs, wherein the PUFs include high energy ions implanted into crystal lattices of semiconductor material of the integrated circuit at a plurality of locations, each location forming one of the PUFs having unique associated damage;
  sensing with an electrical sensor measurable electrical properties of the PUFs when electrically stimulated, wherein the measurable electrical properties of the PUFs of the integrated circuit include at least one of ideality factor, Schottky barrier height, reverse leakage current, carrier mobility, and doping concentration;
  comparing, via a controller, values associated with the measurable electrical properties of the PUFs with one or more groups of stored values in a circuit database, wherein each of the groups of stored values are associated with previously-logged measurable electrical properties of PUFs of at least one known authentic circuit; and
  providing, via the controller, verification of authenticity of the integrated circuit when each of the values associated with the measurable electrical properties of the PUFs match the stored values of at least one of the groups in the circuit database.

2. The method of claim 1, wherein the measurable electrical properties of the PUFs of the integrated circuit are dependent upon at least one of implantation depth of the high energy ions, implantation concentration of the high energy ions, defect density in the semiconductor material, and types of defects in the semiconductor material.

3. The method of claim 1, wherein the step of electrically stimulating includes passing an electric current or strong electric field through each of the PUFs.

4. The method of claim 1, wherein the plurality of locations includes a specific number of areas, cooperatively providing a numerical key serving as a circuit authentication identifier for the circuit, wherein the comparing step includes comparing the numerical key with a plurality of stored keys in the circuit database.

5. The method of claim 1, wherein the semiconductor material may comprise at least one of the following materials: Si, SiGe, GaAs, and GaN.

6. The method of claim 1, wherein the ions implanted into the crystal lattices are at least one of boron and phosphorus.

7. The method of claim 1, further comprising providing, via the controller, an indication that the integrated circuit is a counterfeit circuit when each of the measurable electrical properties of the PUFs of the integrated circuit do not match the stored values of at least one of the groups of stored values in the circuit database.

8. A method of reading physically unclonable functions (PUFs) on an integrated circuit, the method comprising:
  electrically stimulating each of the PUFs, wherein the PUFs include high energy ions implanted into crystal lattices of semiconductor material of the integrated circuit at a plurality of locations by at least one of ion implanters and focused ion beam tools, each location forming one of the PUFs having unique associated damage;
  sensing with an electrical sensor measurable electrical properties of the PUFs when electrically stimulated, wherein the measurable electrical properties of the PUFs of the integrated circuit include at least one of ideality factor, Schottky barrier height, reverse leakage current, carrier mobility, and doping concentration;
  comparing, via a controller, values associated with the measurable electrical properties of the PUFs with one or more groups of stored values in a circuit database, wherein each of the groups of stored values are associated with previously-logged measurable electrical properties of PUFs of at least one known authentic circuit; and
  providing, via the controller, audible or visual indication of authenticity of the integrated circuit when each of the values associated with the measurable electrical properties of the PUFs match the stored values of at least one of the groups in the circuit database.

9. The method of claim 8, further comprising a step of the controller assigning to each of the PUFs one of the values associated with the measurable electrical properties of the PUFs, wherein the assigning step includes solving an algorithm with at least one of the measurable electrical properties or retrieving values from a look-up table using at least one of the measurable electrical properties.

10. The method of claim 8, further comprising the controller using the measurable electrical properties of the PUFs of the integrated circuit to determine at least one of an implantation depth of the high energy ions, implantation concentration of the high energy ions, defect density in the semiconductor material, and types of defects in the semiconductor material.

11. The method of claim 8, wherein the step of electrically stimulating includes passing an electric current or strong electric field through each of the PUFs.

12. The method of claim 8, wherein the plurality of locations includes a number of discrete areas, cooperatively providing a numerical key serving as a circuit authentication identifier for the circuit, wherein the comparing step includes comparing the numerical key with a plurality of stored keys in the circuit database.

13. The method of claim 8, wherein the semiconductor material may comprise at least one of the following materials: Si, SiGe, GaAs, and GaN.

14. The method of claim 8, wherein the ions implanted into the crystal lattices are at least one of boron and phosphorus.

15. The method of claim 8, further comprising an audible or visual indication, via the controller, that the integrated circuit is a counterfeit circuit when each of the values associated with the measurable electrical properties of the PUFs do not match the stored values of at least one of the groups of stored values in the circuit database.

16. An authentication apparatus comprising:
a notification device including at least one of a user interface, visual display device, and speaker; and
a controller including a processor and memory, wherein the memory is a non-transitory computer-readable medium with a computer program stored thereon, the computer program comprising:
   a code segment for instructing an energy source to electrically stimulate each of a plurality of physically unclonable functions (PUFs) by passing an electric current or strong electric field through each of the PUFs, wherein the PUFs include high energy ions implanted into crystal lattices of semiconductor material of the integrated circuit at a plurality of locations by at least one of ion implanters and focused ion beam tools, each location forming one of the PUFs having unique associated damage;
   a code segment for receiving from an electrical sensor measurable electrical properties sensed from the PUFs when electrically stimulated, wherein the measurable electrical properties of the PUFs of the integrated circuit include at least one of include at least one of ideality factor, Schottky barrier height, reverse leakage current, carrier mobility, and doping concentration;
   a code segment for comparing values associated with the measurable electrical properties of the PUFs with one or more groups of stored values in a circuit database, wherein each of the groups of stored values are associated with previously-logged measurable electrical properties of PUFs of at least one known authentic circuit;
   a code segment for commanding the notification device to output an audible or visual indication of authenticity of the integrated circuit when each of the values associated with the measurable electrical properties of the PUFs match the stored values of at least one of the groups of stored values in the circuit database; and
   a code segment for commanding the notification device to output an audible or visual indication that the integrated circuit is a counterfeit circuit when each of the values associated with the measurable electrical properties of the PUFs do not match the stored values of at least one of the groups of stored values in the circuit database.

17. The authentication apparatus of claim 16, wherein audible or visual indication that the integrated circuit is a counterfeit circuit is different than the audible or visual indication of authenticity.

18. The authentication apparatus of claim 16, further comprising the electrical sensor communicably coupled with the processor, wherein the electrical sensor is configured to sense the measurable electrical properties from the PUFs when electrically stimulated.

19. The authentication apparatus of claim 16, wherein the memory of the controller further includes the circuit database.

* * * * *